(12) United States Patent
Kosaka

(10) Patent No.: US 7,954,884 B2
(45) Date of Patent: Jun. 7, 2011

(54) STRUCTURE OF VEHICLE END SECTION

(75) Inventor: Naoya Kosaka, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 268 days.

(21) Appl. No.: 11/885,186

(22) PCT Filed: Feb. 13, 2006

(86) PCT No.: PCT/JP2006/302902
§ 371 (c)(1),
(2), (4) Date: Aug. 28, 2007

(87) PCT Pub. No.: WO2006/092971
PCT Pub. Date: Sep. 8, 2006

(65) Prior Publication Data
US 2009/0256389 A1 Oct. 15, 2009

(30) Foreign Application Priority Data
Feb. 28, 2005 (JP) .............................. P2005-054353

(51) Int. Cl.
*B62D 25/08* (2006.01)
(52) U.S. Cl. ................................................. 296/187.09
(58) Field of Classification Search ............. 296/187.03, 296/187.08, 187.09, 187.11, 193.07, 193.08, 296/193.09, 203.01, 204, 203.02, 203.04; 293/146; 180/311
See application file for complete search history.

(56) References Cited

U.S. PATENT DOCUMENTS 6,375,252 B1  4/2002  Cheron et al.
6,450,276 B1 *  9/2002  Latcau .................... 180/68.4
6,502,659 B2 *  1/2003  Akasaka .................. 180/309
6,598,933 B2 *  7/2003  Taguchi et al. .......... 296/203.02

(Continued)

FOREIGN PATENT DOCUMENTS

DE   10 2004 028 161   12/2005

(Continued)

OTHER PUBLICATIONS

International Search Report.
German Office Action dated Feb. 19, 2009.

*Primary Examiner* — H Gutman
(74) *Attorney, Agent, or Firm* — Finnegan, Henderson, Farabow, Garrett & Dunner, LLP

(57) ABSTRACT

An object of the present invention is to provide a vehicle end structure capable of more reliably receiving a load upon a collision in a vehicle body of the frame construction. The vehicle end structure of the present invention is one constructed near a front end (or rear end) of a framework of a vehicle and is characterized by comprising a pair of body frame members 1 extending in an anteroposterior direction of the vehicle body; a bumper reinforce 3 hung at ends of the pair of frame members 1; a pair of brackets 4 located on the center side of the vehicle with respect to the ends of the pair of frame members 1 and projecting outwardly and laterally from the respective frame members; a pair of outer pillar members 5 extending downward from the respective brackets 4; a cross member 6 hung between the pair of outer pillar members 5; and a pair of inner pillar members 7 joining an upper surface of the cross member 6 to the respective frame members 1.

9 Claims, 3 Drawing Sheets

U.S. PATENT DOCUMENTS

| | | |
|---|---|---|
| 6,712,426 B2 | 3/2004 | Ritchie et al. |
| 6,729,424 B2 * | 5/2004 | Joutaki et al. ............... 180/68.4 |
| 6,736,449 B2 * | 5/2004 | Takahashi et al. ....... 296/203.02 |
| 6,866,333 B2 * | 3/2005 | Saitou ...................... 296/203.02 |
| 7,048,326 B2 * | 5/2006 | Yasui ....................... 296/203.02 |
| 7,219,954 B2 * | 5/2007 | Gomi et al. .............. 296/203.02 |
| 7,461,890 B2 * | 12/2008 | Yatsuda ................... 296/203.02 |
| 2002/0047281 A1 * | 4/2002 | Hartel et al. ................. 293/102 |
| 2002/0190542 A1 * | 12/2002 | Takeuchi et al. .............. 296/194 |
| 2003/0025359 A1 * | 2/2003 | Takahashi et al. ....... 296/203.02 |

FOREIGN PATENT DOCUMENTS

| | | |
|---|---|---|
| EP | 1 000 840 | 5/2000 |
| FR | 2 813 269 | 3/2002 |
| GB | 2 395 931 | 9/2004 |
| JP | 2003-72590 | 3/2003 |
| JP | 2003-327063 | 11/2003 |
| JP | 2004-352101 | 12/2004 |

* cited by examiner

STRUCTURE OF VEHICLE END SECTION

TECHNICAL FIELD

The present invention relates to a vehicle end structure constructed near a front or rear end of a framework of a vehicle.

BACKGROUND ART

The typical construction forms of vehicle body structures include the monocoque construction and the frame construction. The monocoque construction is a construction in which the conventional frame and body are integrally constructed from sheet steel, and is frequently used for passenger cars and the like. On the other hand, the frame construction is a construction in which the body is mounted on a tough framework called a frame. The frame construction is excellent in strength and is frequently used for trucks with a large loading capacity or with a large own weight, recreational vehicles receiving large input from road surfaces, e.g., during running on a rough road, and so on.

A truck has a large vehicle body and thus has a high bumper location. A recreational vehicle also has a rather high bumper location because the vehicle height is set high in order to avoid interference with road surfaces, e.g., on a rough road or because large-size wheels are adopted in order to improve the road ability on rough roads. For this reason, such vehicles are provided with an under protector attached at a position lower than the bumper location (e.g., cf. Japanese Patent Application Laid-Open No. 2003-72590).

When a frame vehicle with a high bumper location collides with a monocoque vehicle with a low bumper location, the above configuration results in making the under protector of the frame vehicle collide with the bumper of the monocoque vehicle to prevent the monocoque vehicle from slipping into the space under the floor of the frame vehicle (called an underride or the like) and to absorb the collision energy by effective deformation of the crushable zone of the monocoque vehicle.

DISCLOSURE OF THE INVENTION

The foregoing under protector is attached to the frame as a framework. For attaching the under protector, brackets are attached as directed downward from a pair of frame members constituting the frame, and the under protector is attached to the brackets. However, the portions of the under protector located outside the brackets in the vehicle are cantilevered, and thus this configuration failed to effectively receive the collision load upon an offset collision which is the majority of collisions.

Since the cantilevered portions are readily bent, there were cases where another vehicle colliding offset with the under protector turned around to the side, so as to damage the side part of the vehicle body. For this reason, there were demands for further improvement in these aspects. An object of the present invention is therefore to provide a vehicle end structure capable of more reliably receiving a load upon collision, in a vehicle body of the frame construction.

A vehicle end structure according to the present invention is a vehicle end structure constructed near a front or rear end of a framework of a vehicle, the vehicle end structure comprising: a pair of body frame members extending in an anteroposterior direction of the vehicle body; a bumper reinforce hung at ends of the pair of frame members; a pair of brackets located on the center side of the vehicle with respect to the ends of the pair of frame members and projecting outwardly and laterally from the respective frame members; a pair of outer pillar members extending downward from the respective brackets; a cross member hung between the pair of outer pillar members; and a pair of inner pillar members joining an upper surface of the cross member to the respective frame members.

This vehicle end structure employs the brackets and the outer pillar members to join the two ends of the cross member (a member corresponding to the under protector or the like) to the frame members. For this reason, the portions outside the inner pillar members are prevented from being deformed upon a collision, and a colliding object in an offset collision can be effectively prevented from turning around to the side of the vehicle. In addition, the pair of frame members as structural members can not receive only the colliding force exerted on the pair of inner pillar members but can also receive the colliding force exerted on the parts outside the inner pillar members, through the brackets and outer pillar members. As a result, the vehicle having this vehicle end structure receives the collision load by the framework and realizes good anti-crash performance.

The vehicle end structure according to the present invention is characterized as follows: in the above-described vehicle end structure, the pair of brackets serve as mount portions of the body to be mounted on the frame members.

Since this vehicle end structure utilizes the brackets for mounting of the body to join the portions near the ends of the cross member to the frame members, new members to be prepared are only the pair of outer pillar members. For this reason, the vehicle end structure of the present invention can be constructed with good space efficiency and in a simple configuration.

Furthermore, the vehicle end structure according to the present invention is characterized as follows: in the aforementioned vehicle end structure, the cross member is constructed as an under protector for protecting a lower surface of the vehicle body from contact with a road surface.

Since in this vehicle end structure the cross member is formed as an under protector, the vehicle end structure of the present invention can be constructed while suppressing an increase in the number of parts.

The vehicle end structure according to the present invention is characterized as follows: the foregoing vehicle end structure comprises a pair of energy absorbing members coupled to front ends of the respective frame members and having a rigidity smaller than that of the frame members.

Since in this vehicle end structure the energy absorbing members have the rigidity smaller than that of the frame members, only the energy absorbing members are deformed upon a mild collision (including an offset collision) to absorb the energy upon the collision. For this reason, the frame members can still be used even after the collision and repair cost can be reduced.

BEST MODE FOR CARRYING OUT THE INVENTION

Figure 1:
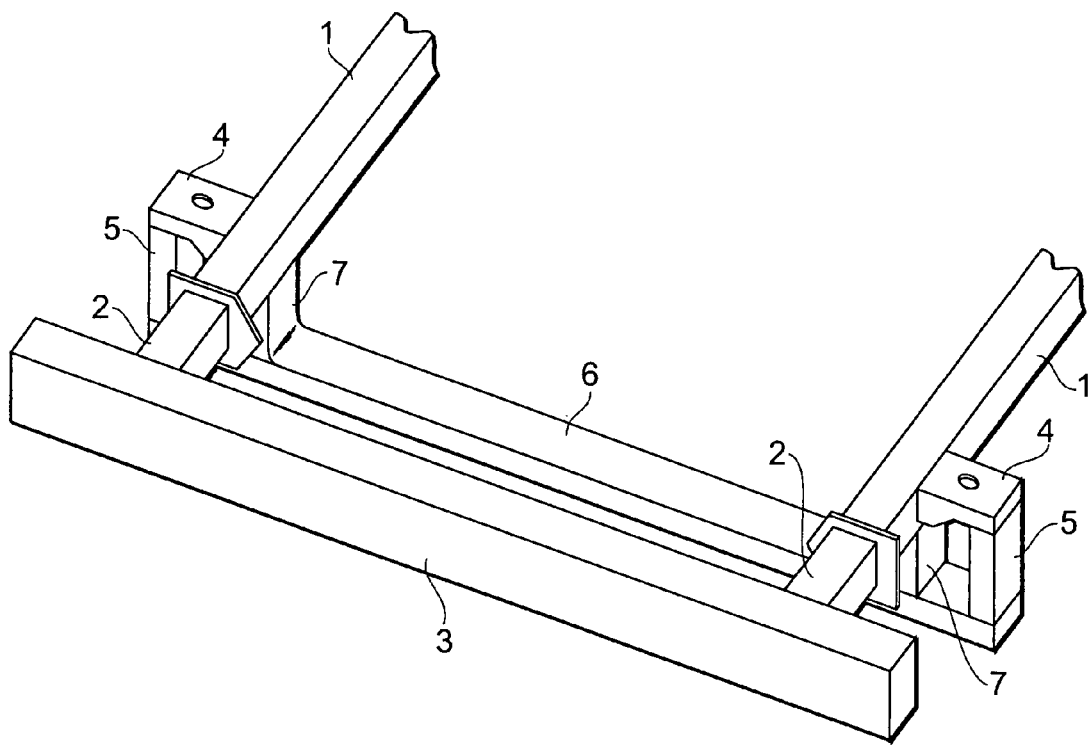
FIG. 1 is a perspective view showing an embodiment of a vehicle end structure according to the present invention.
Figure 2:
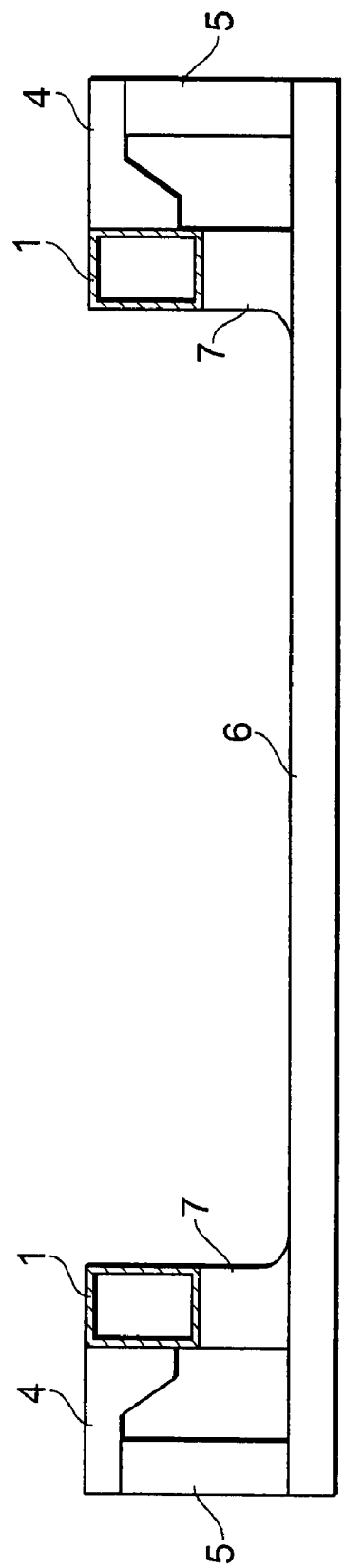
FIG. 2 is a sectional view of the vehicle end structure of FIG. 1 (sectional view obtained by cutting a region near front ends of a pair of frame members and viewing the rear side from the front side of the vehicle).

An embodiment of the vehicle end structure according to the present invention will be described below. FIG. 1 shows an enlarged perspective view of a major part of the vehicle end structure of the present embodiment. FIG. 2 shows a sectional view obtained by cutting a region near front ends of a pair of frame members 1 described later (sectional view of the rear side from the front side of the vehicle). FIGS. 1 and 2 show the vehicle end structure on the front side. A vehicle having the vehicle end structure of the present embodiment is a vehicle of the frame construction. As shown in FIG. 1, a pair of frame members 1 constituting a frame are arranged approximately in parallel with an anteroposterior direction of the vehicle.

The frame members 1 are depicted only in part on the vehicle front side. Crash boxes 2 are joined to the respective tip portions of the pair of frame members 1. The crash boxes 2 have the rigidity smaller than that of the frame members 1 and are provided for the purpose of being crushed upon a relatively mild collision and thereby absorbing the energy upon the mild collision. A bumper reinforce 3 is coupled (through the crash boxes 2) to the extreme ends of the pair of frame members 1.

The bumper reinforce 3 is provided for the purpose of transmitting a load acting on the front face of the vehicle upon a vehicle collision, (through the crash boxes 2) to the frame members 1. Furthermore, brackets 4 for fixing the body to be mounted on the frame, to the frame are joined to respective portions near the front ends of the pair of frame members 1. The pair of brackets 4 are directed outward from the respective frame members 1 and coupled to the respective frame members 1. Each bracket 4 is provided with a screw hole used for fixing of the body.

Outer pillar members 5 are joined to outside ends of the respective brackets 4 as directed downward therefrom. A cross member 6 is hung so as to couple the lower ends of the pair of outer pillar members 5. The cross member 6 is also joined to tips of respective inner pillar members 7 joined to the lower surfaces of the pair of frame members 1 as directed downward therefrom. Namely, the cross member 6 is joined to each of the frame members 1 by the pair of inner pillar members 7, the pair of outer pillar members 5, and the brackets 4. The point herein is that the upper ends of the outer pillar members 5 are joined to the outer ends of the brackets 4 and that the lower ends of the outer pillar members 5 are joined to the upper surface of the cross member 6 outside the joints between the inner pillar members 7 and the cross member 6 longer than the distance in the vehicle width direction between the pair of frame members 1. The outer pillar members 5 may be arranged perpendicularly to the horizontal direction or may be inclined. The vertical location of the cross member 6 is determined to be equivalent to a bumper height of ordinary passenger cars or the like.

Figure 3:
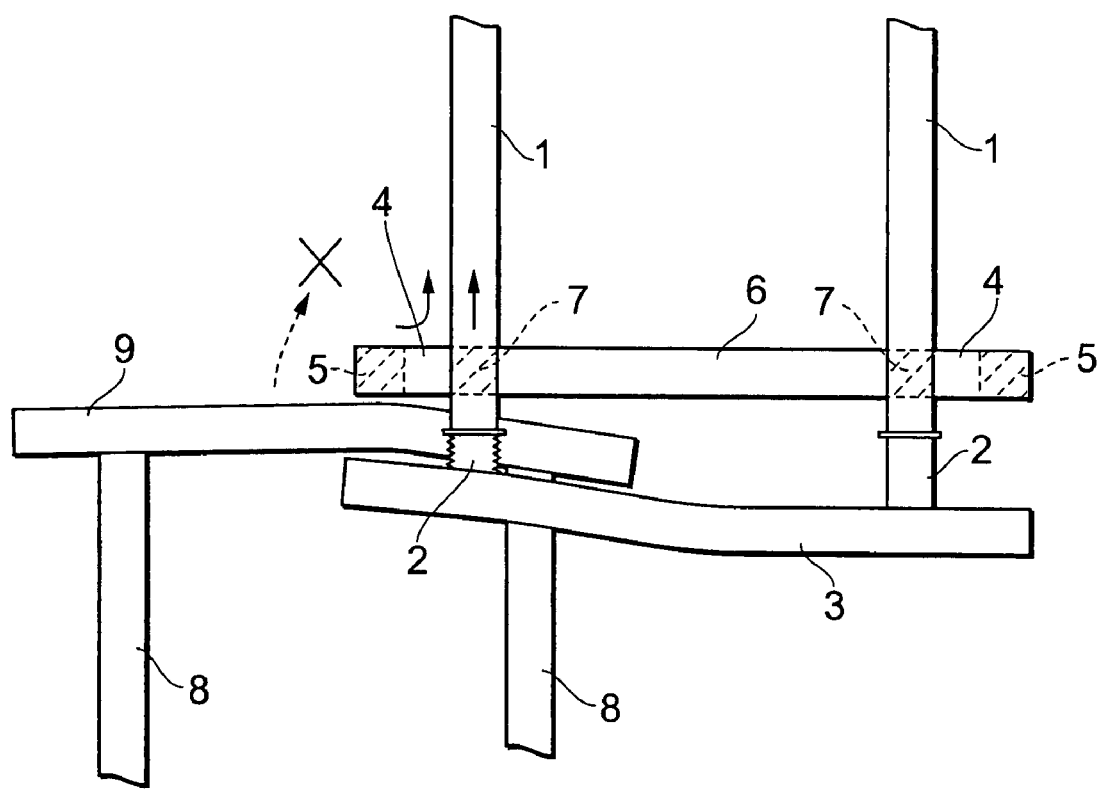
FIG. 3 is a plan view showing a situation upon a collision.

FIG. 3 shows a situation upon a collision of the vehicle with the aforementioned vehicle end structure. FIG. 3 schematically shows only the structural part. The upper part of FIG. 3 shows the front portion of the vehicle equipped with the vehicle end structure of the above-described embodiment. The lower part of FIG. 3 shows a front portion of a passenger car of the monocoque construction. The two vehicles are in an offset collision. The passenger car has a structure in which a bumper reinforce 9 is joined to the front ends of a pair of side members 8.

As the two vehicles collide with each other, the right crash box 2 of the vehicle with the foregoing vehicle end structure is crushed. The right side of the passenger car is also deformed. However, the bumper locations of the two vehicles do not completely agree with each other, and the bumper location of the passenger car is lower; therefore, the front part of the passenger car moves into a region farther than the bumper reinforce 3 of the vehicle with the foregoing vehicle end structure. However, the aforementioned cross member 6 prevents the front part of the passenger car from moving more into the counter vehicle.

Since the portions of the cross member 6 outside the inner pillar members 7 are joined to the frame members 1 as structural members through the outer pillar members 5 and the brackets 4, the portions of the cross member 6 outside the inner pillar members 7 are prevented from being bent backward. For this reason, the collision load is also effectively received by the portions of the cross member 6 outside the inner pillar members 7.

As a result, the cross member 6 effectively functions as a reaction face to the passenger car, and the crushable zone in the front part of the vehicle is effectively deformed to effectively absorb the kinetic energy upon the collision. On the other hand, the vehicle with the foregoing vehicle end structure is able to transmit the load upon the collision to the frame members 1 as a framework via two paths, a path from the inner pillar members 7 to the frame members 1 and a path from the outer pillar members 5 and brackets 4 to the frame members 1.

On this occasion, the outer pillar members 5 and brackets 4 prevent the portions of the cross member 6 outside the inner pillar members 7 from being deformed backward. For this reason, the collision load received by the part of the cross member 6 between the inner pillar members 7 and the outer pillar members 5 can also be surely transmitted to the frame members 1. Since the backward deformation is prevented for the portions of the cross member 6 outside the inner pillar members 7, a colliding object (passenger car) can be prevented from turning around to the side of the vehicle body as indicated by an arrow in FIG. 3. For this reason, the side of the vehicle can be prevented from being damaged by the turnaround of the passenger car.

Furthermore, since occurrence of the turnaround as described above does not allow effective absorption of the kinetic energy upon the collision through deformation of each part of the vehicle, the prevention of the turnaround also leads to an improvement in anti-collision performance (absorption performance of collision energy). As the load is fed to the frame members 1 during the collision, the frame members 1 are deformed to absorb the kinetic energy upon the collision. The present invention is effectively applicable to vehicles of the frame construction because they are under such circumstances that it is difficult to ensure a large separation between the pair of frame members 1, as described below.

In the case of the recreational vehicles and others to which the frame construction is frequently applied, it is often the case that it is difficult to ensure a large separation between the pair of frame members 1 relative to the vehicle width for the reason that large-size wheels are mounted. Particularly, on the front side, it is more difficult to ensure a large separation between the pair of frame members 1 than on the rear side because the wheels are steered. In the case of the recreational vehicles and others, the four-wheel-drive system is often adopted, and in the four wheel drive the engine is often longitudinally mounted in terms of the relation with the transmission. In such cases, it is unfavorable that the separation between the pair of frame members 1 is set large, in view of the mounting of the engine on the frame.

In light of the above-described situation as well, if the cross member 6 is set in a length approximately equal to the full vehicle width, the cantilevered portions at the two ends thereof will tend to become long in the case of the cross member 6 as described above (unless it is joined to the frame members 1 through the brackets 4 and outer pillar members 5). (It is a matter of course that the cross member 6 is preferably set to a length as close to the full vehicle width as possible, from the viewpoint of receiving the collision load upon the vehicle collision.) When the cantilevered portions are long, the part of the cross member 6 capable of securely receiving the load upon the collision becomes only the portion between the pair of frame members 1 (or the inner pillar members 7). This will result in failing to effectively absorb the energy upon the collision. The present invention described above avoids it well.

The present invention is not limited to the above-described embodiment. For example, the foregoing embodiment showed the vehicle end structure constructed as one for the front part of the vehicle body, but the vehicle end structure may also be constructed as one for the rear part of the vehicle body. In the foregoing embodiment the cross member 6 was set as a simple rod-shaped member, but the cross member may also be constructed as an under protector for protecting the lower surface of the vehicle body from contact with road surfaces. The vehicles to which the present invention is applicable embrace tractor vehicles (including container portions).

INDUSTRIAL APPLICABILITY

Since in the vehicle end structure of the present invention the two ends of the cross member are joined to the frame members through the brackets and outer pillar members, the portions outside the inner pillar members are prevented from being deformed upon collision and the pair of frame members as structural members can not receive only the collision force exerted on the pair of inner pillar members, but can also receive the collision force exerted on the portions outside the inner pillar members through the brackets and outer pillar members. For this reason, this vehicle end structure is able to reliably receive the collision load. As a result, the vehicle with this vehicle end structure is able to receive the collision load by the framework and to realize good anti-collision performance.

The invention claimed is:

1. A vehicle end structure constructed near a front or rear end of a framework of a vehicle, the vehicle end structure comprising:
   a pair of body frame members extending in an anteroposterior direction of the framework of the vehicle;
   a bumper member mounted at ends of the pair of body frame members;
   a pair of brackets located on the respective body frame members inwardly from the bumper member in the anteroposterior direction of the framework of the vehicle and projecting outwardly and horizontally from the respective body frame members;
   a pair of outer pillar members extending downward from the respective brackets;
   a cross member mounted between the pair of outer pillar members, each of the pair of outer pillar members having a lowermost end joined to a top surface of the cross member; and
   a pair of inner pillar members joining the top surface of the cross member to the respective body frame members;
   wherein the cross member crosses the pair of body frame members in a vehicle width direction.

2. The vehicle end structure according to claim 1, further comprising a mount portion on each of the pair of brackets for attaching the vehicle end structure to the framework of the vehicle.

3. The vehicle end structure according to claim 2, comprising a pair of energy absorbing members coupled to front ends of the respective body frame members and having a rigidity smaller than that of the body frame members.

4. The vehicle end structure according to claim 2, further comprising a screw hole in each mount portion for attaching the vehicle end structure to the framework of the vehicle.

5. The vehicle end structure according to claim 1, wherein the cross member is constructed as an under protector for protecting a lower surface of a vehicle body from contact with a road surface.

6. The vehicle end structure according to claim 5, comprising a pair of energy absorbing members coupled to front ends of the respective body frame members and having a rigidity smaller than that of the body frame members.

7. The vehicle end structure according to claim 1, comprising a pair of energy absorbing members coupled to front ends of the respective body frame members and having a rigidity smaller than that of the body frame members.

8. The vehicle end structure according to claim 1, wherein each of the pair of outer pillar members has an uppermost end joined to a respective outermost end of one of the pair of brackets.

9. The vehicle end structure according to claim 1, wherein each of the pair of inner pillar members has a lowermost end joined to the top surface of the cross member, and wherein each of the pair of inner pillar members has an uppermost end joined to a respective bottom surface of one of the body frame members.

* * * * *